(12) United States Patent
Kendall et al.

(10) Patent No.: US 11,269,198 B1
(45) Date of Patent: Mar. 8, 2022

(54) EYEGLASSES FOGGING PREVENTION APPARATUS

(71) Applicants: Dwain Kendall, High Point, NC (US); Saundra Creecy, Mt. Laurel, NJ (US)

(72) Inventors: Dwain Kendall, High Point, NC (US); Saundra Creecy, Mt. Laurel, NJ (US)

( * ) Notice: Subject to any disclaimer, the term of this patent is extended or adjusted under 35 U.S.C. 154(b) by 0 days.

(21) Appl. No.: 17/472,861

(22) Filed: Sep. 13, 2021

(51) Int. Cl.
*G02C 11/08* (2006.01)

(52) U.S. Cl.
CPC .................. *G02C 11/08* (2013.01)

(58) Field of Classification Search
CPC .......... G02C 11/08; G02C 11/00; G02C 1/04; G02C 2200/08; G02C 7/02; G02C 5/001; G02C 9/00; G02C 3/003; G02C 7/16; G02C 11/12; G02C 5/00; G02C 5/126; G02C 5/146; G02C 5/20; G02C 5/2263; G02C 11/02; G02C 1/06; G02C 2200/04; G02C 2200/16; G02C 5/10; A61F 9/028; A61F 9/026; A61F 9/029; A61F 9/025; A61F 9/02; A61F 9/04; A61F 9/027; A61F 11/14; A61F 2009/021; A61F 9/0008; A61F 9/022; A61F 9/045
See application file for complete search history.

(56) References Cited

U.S. PATENT DOCUMENTS

| | | | | |
|---|---|---|---|---|
| 6,213,125 B1 * | 4/2001 | Reese | ................ | A41D 13/1115 128/857 |
| 7,836,887 B1 * | 11/2010 | Kling | ................. | A41D 13/1161 128/206.16 |
| 7,866,812 B1 * | 1/2011 | Tullis | ....................... | G02C 9/04 351/47 |
| 2010/0313890 A1 * | 12/2010 | Messier | ............. | B01D 39/1623 128/206.19 |
| 2012/0289838 A1 * | 11/2012 | Varga | .................... | A61M 16/06 600/473 |
| 2014/0109918 A1 * | 4/2014 | Nabai | ....................... | A61F 9/04 128/858 |
| 2017/0157435 A1 * | 6/2017 | Choi | .................. | A41D 13/1107 |
| 2019/0361519 A1 * | 11/2019 | Lee | .......................... | G06F 3/011 |
| 2021/0041724 A1 * | 2/2021 | Ahi | ........................ | A41D 13/11 |

FOREIGN PATENT DOCUMENTS

CN 205682513 U * 11/2016

OTHER PUBLICATIONS

CN205682513U Nov. 2016 English.*

* cited by examiner

*Primary Examiner* — William R Alexander
*Assistant Examiner* — Sharrief I Broome
(74) *Attorney, Agent, or Firm* — Stuart M. Goldstein

(57) ABSTRACT

An eyeglasses fogging prevention apparatus consists of a strip made of stretchable, elastic material. The strip has a central section made of pliant, form fitting material and strip adjustment clips for shortening and lengthening the strip. Loop sections are located at opposite ends of the strip, at least one adjustment clip being located between the central section and one of the loop sections. The apparatus is configured to be positioned across the face of a user who is wearing eyeglasses, beneath the eyeglasses of the user, with the loop end sections placed over the user's ears and the central section placed over and down the sides of the bridge of the nose of the user. The apparatus is held against the user's nose by altering the length of the strip with the adjustment clips, such that the strip is compelled tight against the nose, thereby preventing fogging of the eyeglasses.

3 Claims, 3 Drawing Sheets

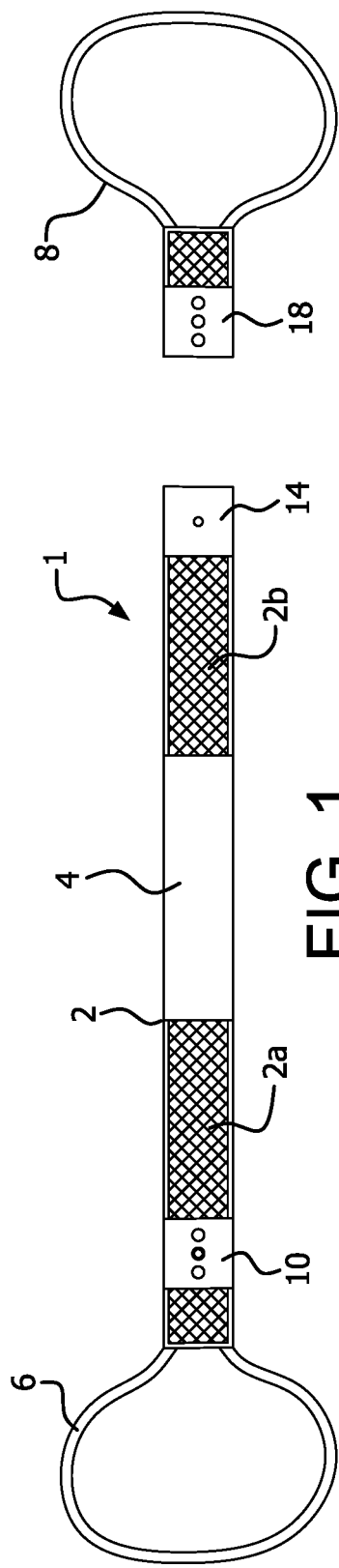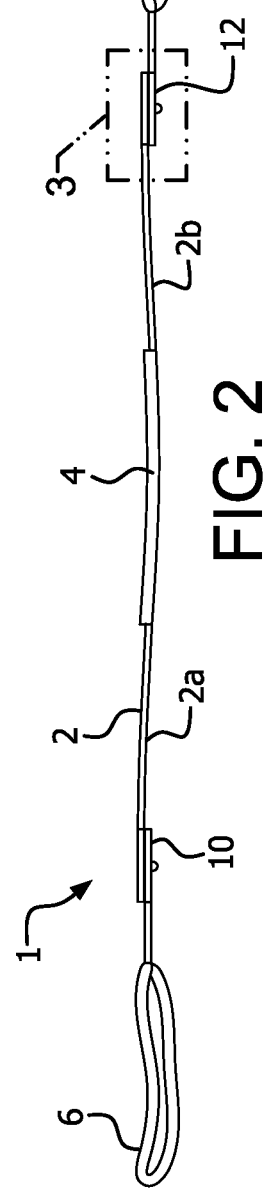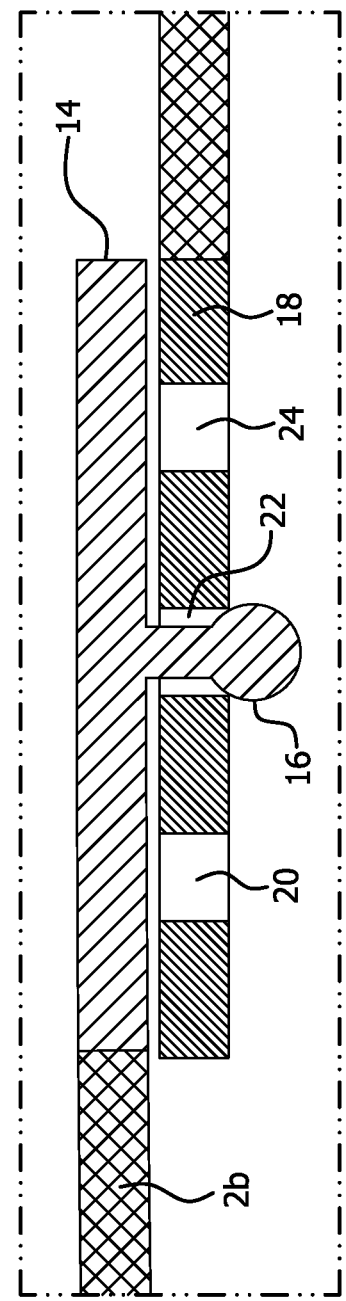

EYEGLASSES FOGGING PREVENTION APPARATUS

FIELD OF THE INVENTION

The present invention relates generally to eyewear accessories and especially to anti-fogging devices to be used with eyeglasses.

BACKGROUND OF THE INVENTION

When worn normally, eyewear, including eyeglasses, goggles, or other vision and safety enhancing optical wear, is subject to fogging caused by moisture build-up from breathing. Eyewear fogging interferes with the user's vision and routinely causes repeated and annoying efforts to clear lenses. These problems sometimes discourage users from wearing eyewear, especially eyeglasses, when they are required to do so during the course of their employment, but, significantly, also for their own health and safety and the health and safety of others. Ensuring that glasses do not fog up when facemasks must be worn by health care providers is especially critical. Certain facemasks do incorporate some type of sealing material across the top edge of the masks; but this is not very effective in eliminating fogging, since the masks generally do not fit properly on the user's face, they are not adjustable, and they are uncomfortable. Moreover, facemasks tend to exacerbate the build-up of moisture from breathing. As a result, in attempting to eliminate fog from lenses, the entire mask and/or the eyeglasses themselves must be removed to be cleaned, a process which could delay a procedure and jeopardize health and safety. Even when the use of a mask is unnecessary, there is no current, self-contained apparatus which will effectively eliminate fogging of eyeglasses.

SUMMARY OF THE INVENTION

It is thus the object of the present invention to provide a self-contained, independent eyeglasses fogging prevention apparatus which can be used with or without a facemask in order to effectively and efficiently eliminate fogging of eyeglasses.

It is a further object of the present invention to provide a self-contained, independent eyeglasses fogging prevention apparatus which can be quickly and easily removed when necessary.

It is a further object of the present invention to provide a self-contained, independent eyeglasses fogging prevention apparatus which is readily and easily adjustable for the comfort of the user and in order to enhance the defogging effects of the invention.

It is still another object of the present invention to provide a self-contained, independent eyeglasses fogging prevention apparatus which will serve as encouragement to users to wear eyeglasses when they are required, given the effectiveness and ease of use of the invention.

These and other objects of the present invention are accomplished by the present invention, a strip made of stretchable, elastic material. The strip has a central section made of pliant, form fitting material and strip adjustment clips for shortening and lengthening the strip. Loop sections are located at opposite ends of the strip, at least one adjustment clip being located between the central section and one of the loop sections. The apparatus is configured to be positioned across the face of a user who is wearing eyeglasses, beneath the eyeglasses of the user, with the loop end sections placed over the user's ears and the central section placed over and down the sides of the bridge of the nose of the user. The apparatus is held against the user's nose by altering the length of the strip with the adjustment clips, such that the strip is compelled tight against the nose, thereby preventing fogging of the eyeglasses.

The novel features which are considered as characteristic of the invention are set forth in particular in the appended claims. The invention itself, however, both as to its design, construction, and use, together with additional features and advantages thereof, are best understood upon review of the following detailed description with reference to the accompanying drawings.

BRIEF DESCRIPTION OF THE DRAWINGS

FIG. 1 is a top view of the eyeglasses fogging prevention apparatus of the present invention.

FIG. 2 is an elevation view of the eyeglasses fogging prevention apparatus of the present invention.

FIG. 3 is a section view taken from FIG. 2.

DETAILED DESCRIPTION OF THE INVENTION

Figure 4:
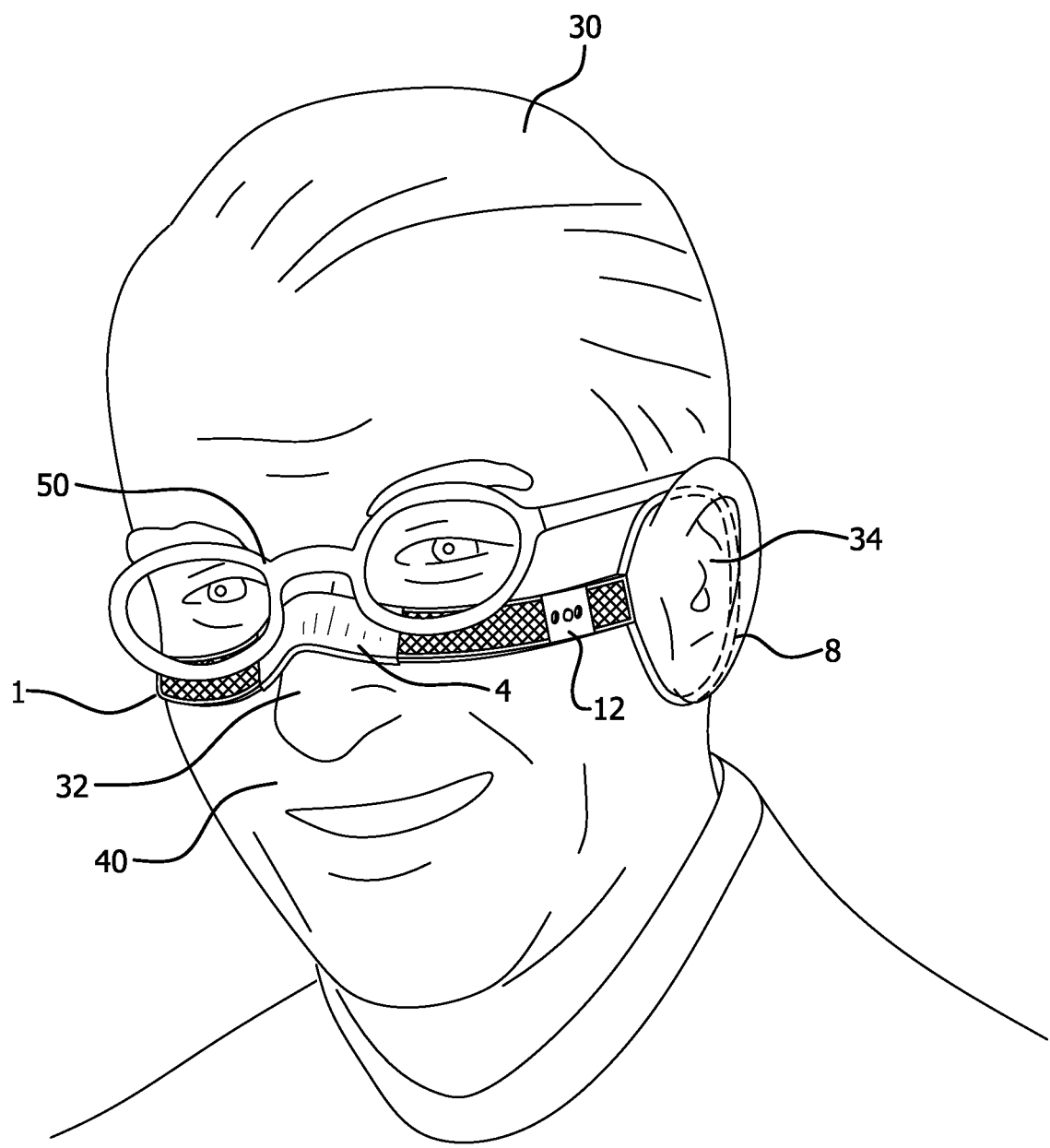
FIG. 4 is a view illustrating the eyeglasses fogging prevention apparatus of the present invention properly positioned on a user.

Eyeglasses fog prevention apparatus 1 of the present invention comprises strip 2 having left section 2a and right section 2b made of a stretchable, elastic material like a flexible rubber or equivalent extendible, expandable material. Strip 2 has central section 4 which is made of pliant, form fitting material. Loop sections 6 and 8 are formed at the opposite ends of strip 2. Strip adjustment means in the form of adjustment clips or equivalent adjustment devices 10 and 12 are located between central section 8 and loop sections 6 and 8 for shortening and lengthening strip 2.

Adjustment clips 10 and 12 each contain snap together elements 14 and 18. As best seen in FIG. 3, element 14 has tab 16 which is configured to be inserted and snapped into adjustment openings 20, 22 or 24 in element 18, depending on the desired length of strip 1. While the disclosure depicts two elements 14 and 18, only one element instead of two may be utilized in strip 1. It is also contemplated that equivalent adjustment means can be utilized with strip 1 and the invention should not be considered so restricted.

Figure 5:
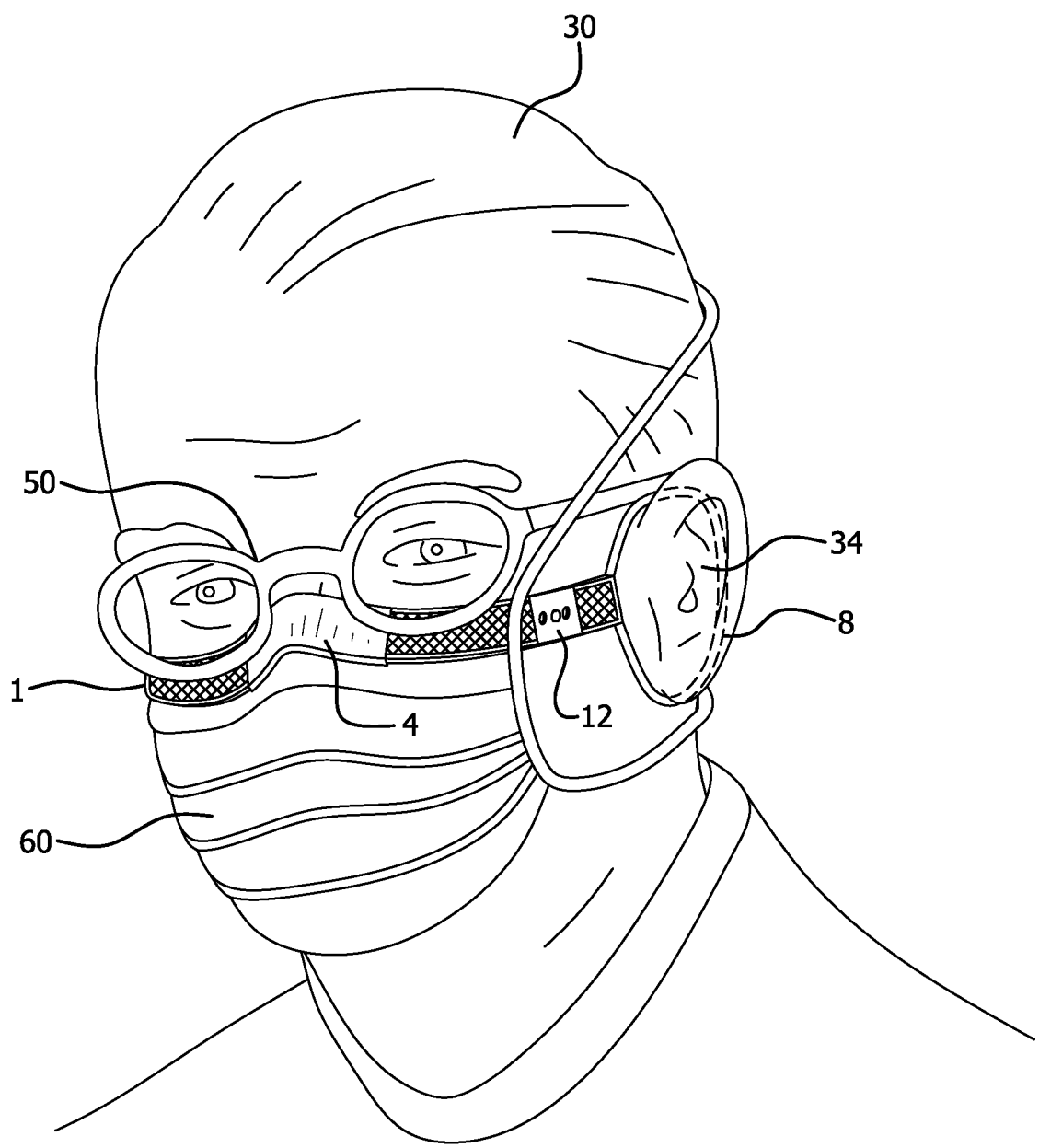
FIG. 5 is a view illustrating the eyeglasses fogging prevention apparatus of the present invention positioned on a user who is also wearing a facemask.

As seen in FIGS. 4 and 5, apparatus 1 is configured to be positioned across face 40 of user 30, beneath eyeglasses 50 of the user. Central section 4 is placed over the bridge of nose 32 of the user, such that the central section extends completely over the bridge and down the sides of the nose. Loop sections 6 and 8 are looped around the user's ears, only loop section 8 being shown over ear 34 of user 30 in FIGS. 4 and 5. Adjustment clip 12 is positioned to alter the length of strip 1 such that the strip is held and compelled tight against nose 32. By using apparatus 1 in this manner, eyeglasses 50 will not fog up as user 30 breathes normally. The extended length of central section 8 over nose 32, especially, assists in preventing fogging.

It is evident that eyeglasses fogging prevention apparatus 1 is an independent, self-contained device, which eliminates the fogging of eyeglasses, when adjusted and worn properly. As seen in FIG. 5, apparatus 1 can also be used in combination with face mask 60 to prevent fogging of eyeglasses, when the use of a mask is required.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An eyeglasses fogging prevention apparatus comprising:
    a stand-alone, independent, and unattached self-contained strip made of stretchable, elastic material, said strip comprising separate right and left sections of stretchable, elastic material separated by a specifically defined central section made of pliant, form fitting material configured to extend completely over the bridge and down the sides of the nose of the user, and strip adjustment means for shortening and lengthening the strip; and
    loop sections located at opposite ends of the strip, the adjustment means being located between the central section and at least one of the loop sections, wherein the apparatus is configured to be positioned across the face of a user wearing eyeglasses, beneath the eyeglasses of the user, with the loop end sections placed over the ears of the user and the central section placed over the bridge of the nose of the user, held against the nose of the user by altering the length of the strip with the adjustment means, such that the strip is compelled tight against the user's nose to prevent fogging of the eyeglasses.

2. The apparatus as in claim 1 wherein the adjustment means comprises at least one adjustment clip.

3. The apparatus as in claim 1 wherein the adjustment means comprises two adjustment clips.

* * * * *